(12) United States Patent
Joguet et al.

(10) Patent No.: US 8,427,180 B2
(45) Date of Patent: Apr. 23, 2013

(54) MULTICONTACT TACTILE SENSOR WITH SINGLE-CONTACT IDLE MODE

(75) Inventors: Pascal Joguet, Sadirac (FR); Guillaume Largillier, Bordeaux (FR); Julien Olivier, Bordeaux (FR)

(73) Assignee: Stantum, Bordeaux (FR)

( * ) Notice: Subject to any disclaimer, the term of this patent is extended or adjusted under 35 U.S.C. 154(b) by 390 days.

(21) Appl. No.: 12/809,399

(22) PCT Filed: Dec. 19, 2008

(86) PCT No.: PCT/FR2008/001807
§ 371 (c)(1),
(2), (4) Date: Jun. 18, 2010

(87) PCT Pub. No.: WO2009/106738
PCT Pub. Date: Sep. 3, 2009

(65) Prior Publication Data
US 2011/0001487 A1    Jan. 6, 2011

(30) Foreign Application Priority Data
Dec. 19, 2007  (FR) ...................... 07 60012

(51) Int. Cl.
*G01R 27/26* (2006.01)
*G06F 3/041* (2006.01)

(52) U.S. Cl.
USPC ......................................... 324/686; 345/173

(58) Field of Classification Search .................. 324/600, 324/686, 548; 345/173, 174
See application file for complete search history.

(56) References Cited

U.S. PATENT DOCUMENTS

| | | | |
|---|---|---|---|
| 5,559,301 A * | 9/1996 | Bryan et al. | ................. 84/653 |
| 2003/0098858 A1 | 5/2003 | Perski et al. | |
| 2007/0063991 A1 | 3/2007 | Lee et al. | |
| 2010/0182277 A1 * | 7/2010 | Nakajima et al. | ............. 345/174 |

OTHER PUBLICATIONS

U.S. Appl. No. 12/808,841, filed Jun. 17, 2010, Joguet, et al.
U.S. Appl. No. 13/057,582, filed Feb. 4, 2011, Joquet, et al.

* cited by examiner

*Primary Examiner* — Hoai-An D Nguyen
(74) *Attorney, Agent, or Firm* — Oblon, Spivak, McClelland, Maier & Neustadt, L.L.P.

(57) ABSTRACT

A multicontact tactile sensor including a matrix formed of two transparent conducting layers, at least one exhibiting an array of fine conducting tracks, a control circuit including a power supply for one of the layers, and a mechanism detecting the other layer, the sensor having an operating mode of multicontact type corresponding to a sweep of supply to the lines of the corresponding layer, and an operating mode of monocontact type corresponding to a continuous and uniform supply over a whole of the sensor, each operating mode being activated as a function of the detection or nondetection of at least one contact.

8 Claims, 5 Drawing Sheets

MULTICONTACT TACTILE SENSOR WITH SINGLE-CONTACT IDLE MODE

Figure 1:
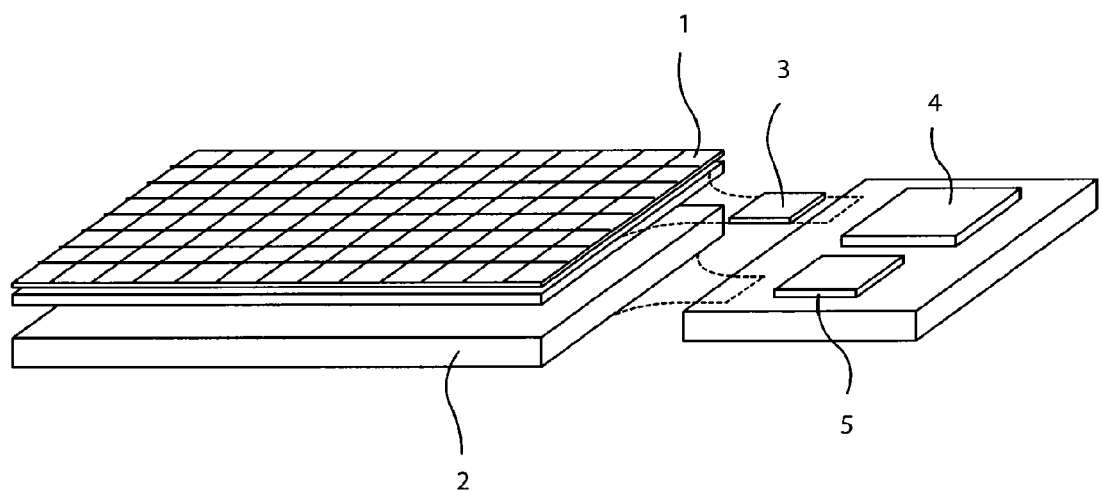

The present invention concerns a multicontact tactile sensor with a single-contact idle mode.

The present invention concerns the field of multicontact tactile sensors.

This type of sensor is provided with means for simultaneous acquisition of the position, the pressure, the size, the shape and the movement of a plurality of fingers on its surface, in order to control equipment, preferably via a graphical interface.

These sensors can be used in numerous devices such as mobile telephones, computers, etc. This list is not limiting on the present invention.

There are known in the art transparent multicontact tactile sensors with a resistive tablet. These sensors advantageously comprise a transparent semiconductor active layer situated between two transparent conductive layers on which are printed rows or columns corresponding to conductive wires.

Said conductive layers are thus arranged in a matrix of cells formed by the intersection of rows and columns. The semiconductor layer functions as an open switch when the tactile screen is not touched and a closed switch when the tactile screen is touched, which brings the two conductive layers into contact.

Said conductive layers are generally a glass plate and a polyester film. They serve as electrodes, and each has on one of their surfaces a conductive layer produced in a transparent conductive material.

There has been proposed in the prior art a solution described in the patent FR 2,866,726 covering a device further including a bidimensional multicontact sensor for the acquisition of tactile information. Said sensor as described in said patent consists of a resistive matrix tablet further consisting of two transparent conductive layers on which are printed rows or columns corresponding to conductive wires and an insulative material between said two transparent conductive layers. A prior art transparent conductive layer is advantageously produced in ITO, which is a conductive material and transparent in very thin layers.

The drawback of this solution is that such a sensor consumes much more electrical energy that a monocontact tactile sensor.

A monocontact tactile sensor consumes energy corresponding only to the leakage current, whereas a multicontact tactile sensor implies energizing one of the two arrays of conductive tracks at regular intervals, which is the cause of a much higher current consumption.

Thus when a user is not touching the sensor, and thus not using it, it nevertheless consumes a current substantially equal to that consumed when the user defines a contact area or even a plurality of contact areas.

The object of the present invention is to remedy this drawback by proposing a multicontact tactile sensor operating in two distinct modes:

a monocontact mode—or idle mode—of operation in which the sensor behaves like a monocontact tactile sensor when the sensor detects no contact, and a multicontact mode—or scanning mode—of operation corresponding to the usual mode of operation of the sensor when a contact is detected during operation in monocontact mode.

This approach has consisted in studying the utility of operation in multicontact mode. It has become apparent that such operation may be implemented only when the user has defined at least one contact area. The rest of the time, a simple mode of operation similar to a monocontact mode of operation suffices. As soon as a contact is detected, the sensor switches to the multicontact mode of operation for as long as at least one contact continues to be detected.

Thus a multicontact tactile sensor of the present invention makes it possible to make significant energy savings, as high current consumption is limited to times at which the user is using the sensor, namely times at which at least one contact is detected by the sensor.

To this end, the present invention proposes a multicontact tactile sensor including a matrix formed of two transparent conductive layers, at least one having an array of fine conductive tracks, and a control circuit with energization means for one of the layers and detection means for the other layer, said sensor having a multicontact type mode of operation corresponding to scanned energization of the rows of the corresponding layer, characterized in that it also has a monocontact type mode of operation corresponding to continuous and uniform energization of the whole of the sensor, each mode of operation being activated as a function of the detection or non-detection of at least one contact.

According to particular embodiments of the present invention:

the multicontact mode is activated by the detection of at least one contact;

the monocontact mode is activated by the absence of detection of at least one contact;

the monocontact mode is activated after a latency time during which no contact is detected;

the multicontact type mode of operation corresponds to scanned energization of the rows of the corresponding layer and to measurement at the terminals of the point of intersection between the energized rows and each of the columns of the other layer;

the monocontact type mode of operation is an idle mode corresponding to an idle state of the sensor and the control circuit;

the monocontact type mode of operation corresponds to continuous and uniform energization of all the columns and to detection effected by scanning the rows;

the sensor is transparent.

Figure 2:
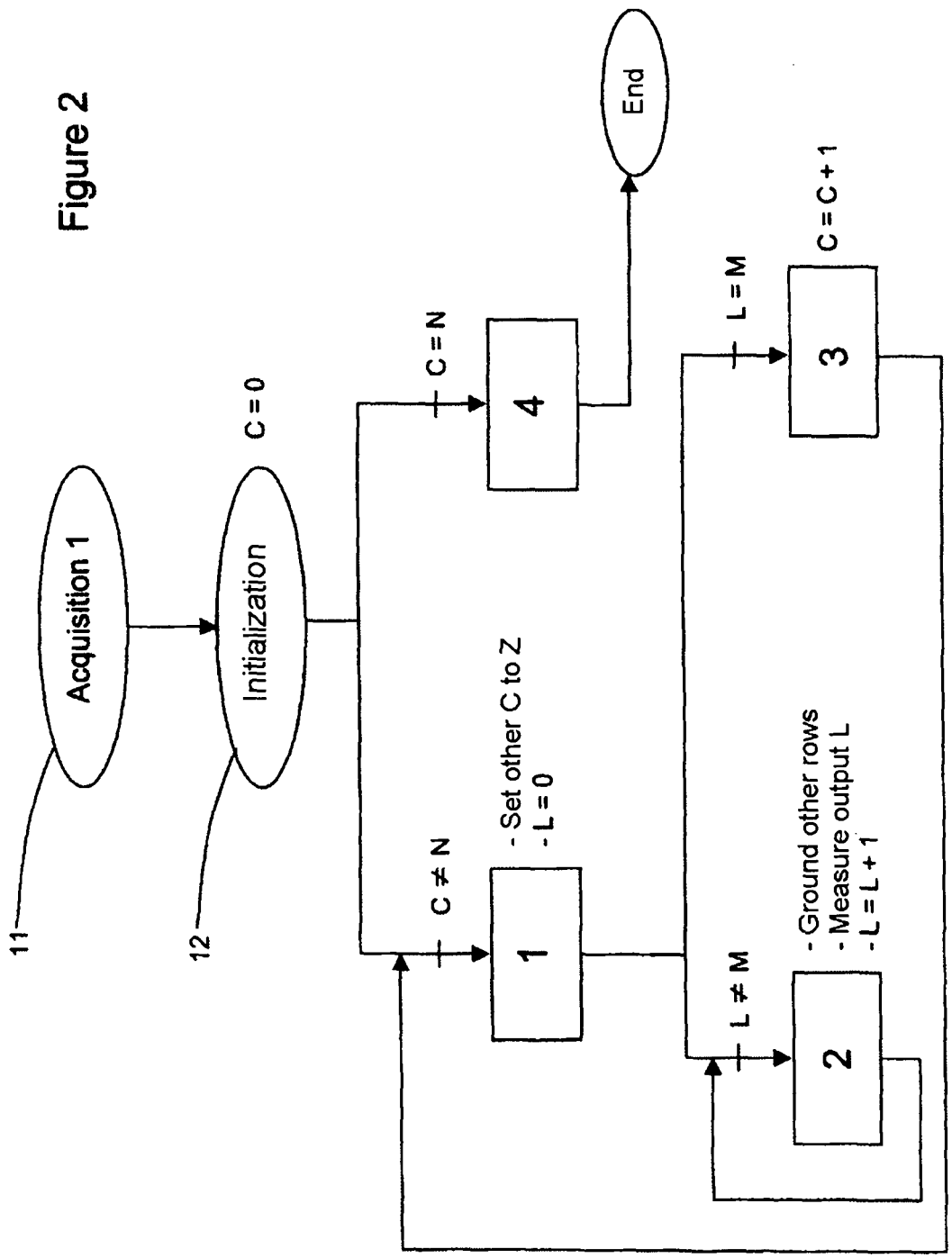
Figure 3:
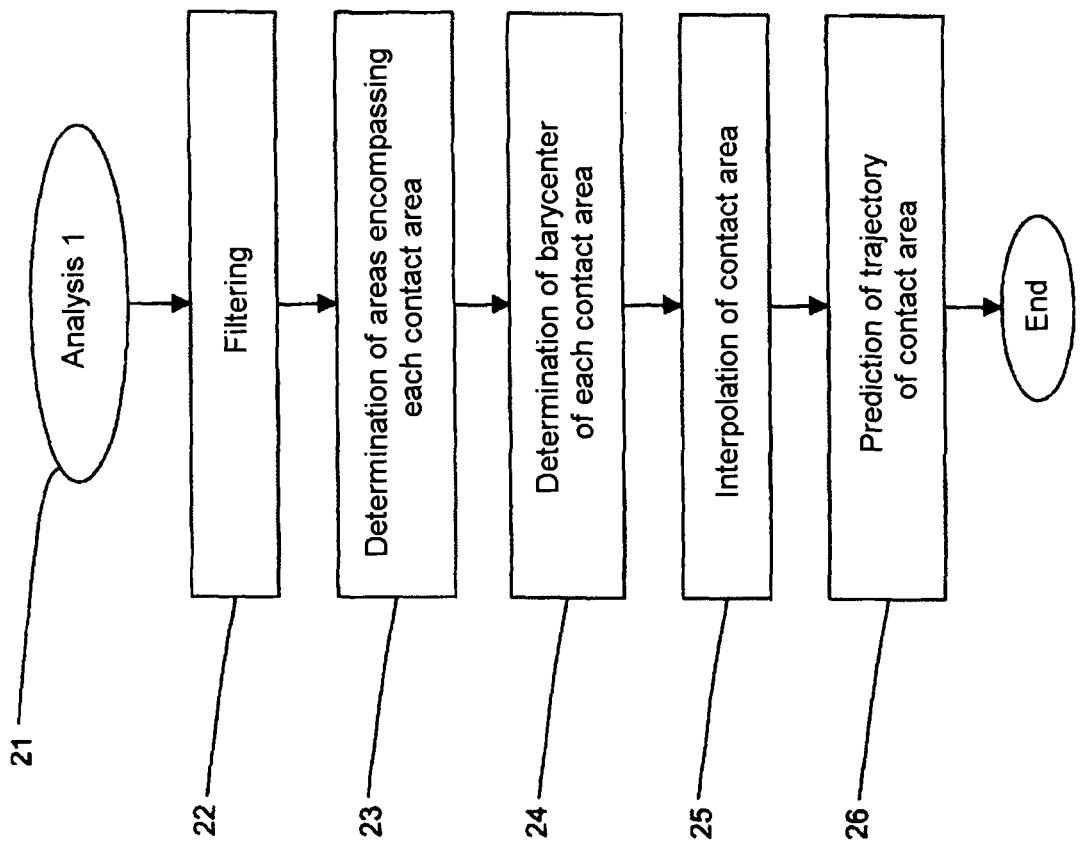
Figure 4:
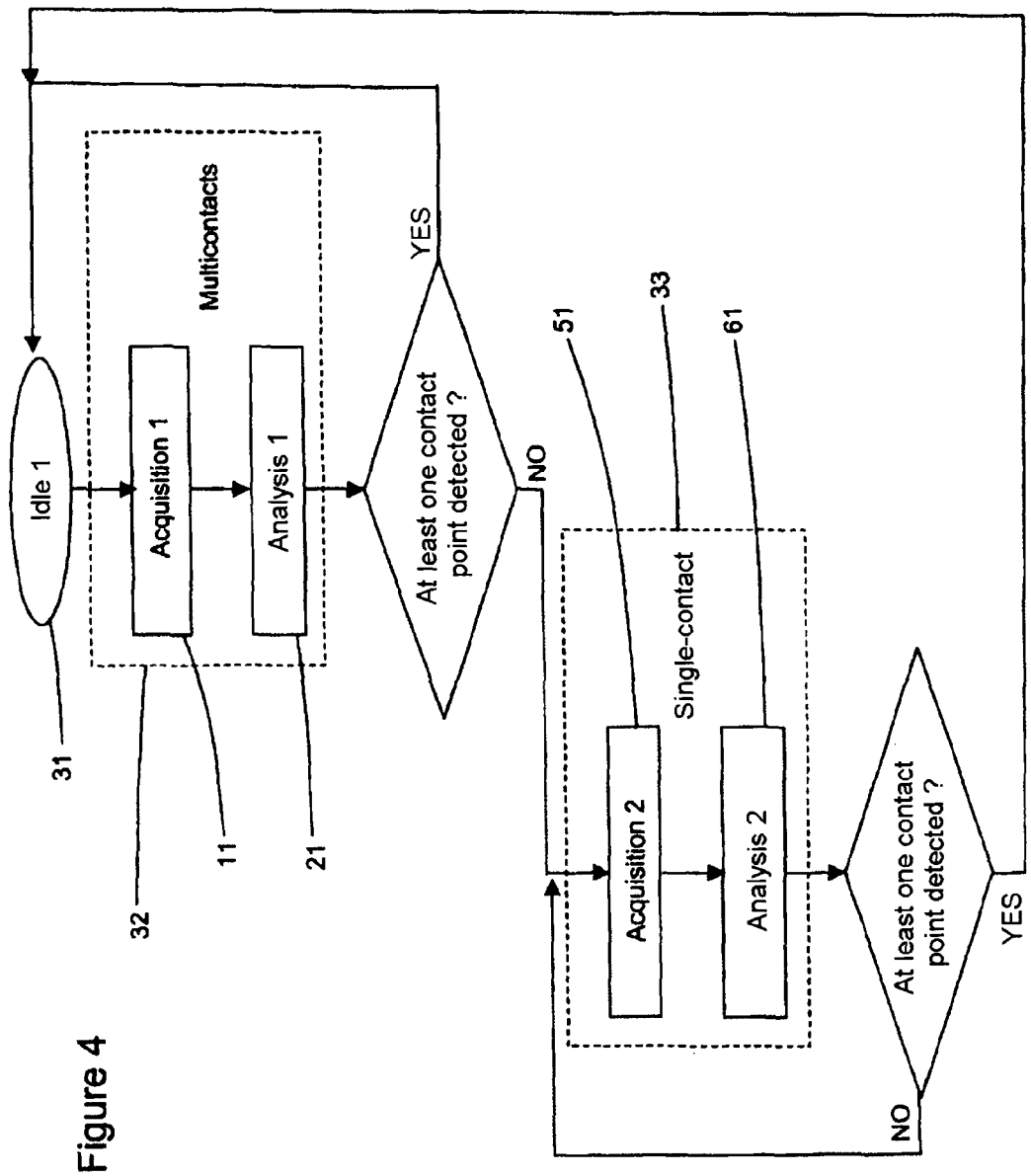
Figure 5:
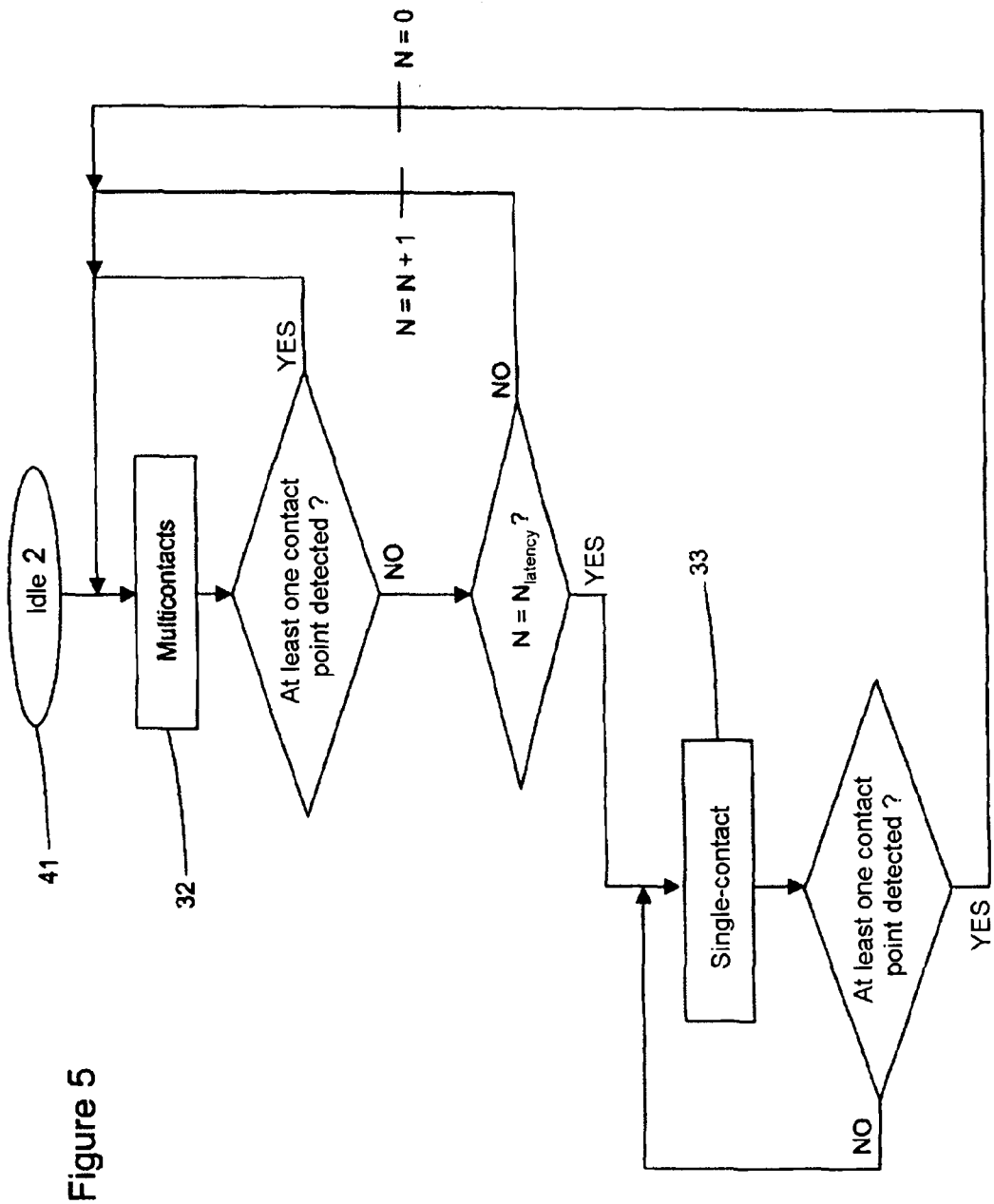

The present invention will be better understood on reading the detailed description of one nonlimiting embodiment of the present invention, accompanied by appended figures respectively representing:

FIG. 1, a view of a tactile electronic device,

FIG. 2, a diagram of the method of acquisition of data over the whole of the multicontact tactile sensor (acquisition 1), FIG. 3, a diagram of the method of analyzing the data (analysis 1), FIG. 4, a diagram of the method of the present invention of idling the sensor (idle 1), and FIG. 5, a diagram of the method of the present invention of idling the sensor (idle 2).

A multicontact transparent tactile sensor of the present invention is intended to be integrated into a multicontact tactile display screen.

FIG. 1 represents a view of a tactile electronic device comprising:

a matrix tactile sensor 1, a display screen 2, a capture interface 3, a main processor 4, and a graphic processor 5.

The first fundamental element of said tactile device is the tactile sensor 1, necessary for acquisition—multicontact manipulation—with the aid of a capture interface 3. This capture interface 3 contains acquisition and analysis circuits.

Said tactile sensor 1 is of matrix type. Said sensor can be divided into a plurality of parts in order to accelerate capture, each part being scanned simultaneously.

Data from the capture interface 3 is transmitted after filtering to the main processor 4. The latter executes the local program for associating data from the tablet with graphic objects that are displayed on the screen 2 in order to manipulate it.

The main processor 4 also transmits to the graphical interface 5 the data to be displayed on the display screen 2. This graphical interface can moreover be controlled by a graphics processor.

The present embodiment of the present invention concerns a passive matrix multicontact tactile sensor. It is to be understood that the person skilled in the art is equally capable of implementing the present invention on an active matrix transparent tactile sensor.

Such a multicontact tactile sensor is controlled in the following manner: during a first scanning phase, the tracks of one of the arrays are energized successively and the response on each of the tracks of the second array is detected. Contact areas that correspond to nodes the state of which is modified relative to the idle state are determined as a function of these responses. One or more sets of adjacent nodes the state of which has been modified are determined. A set of such adjacent nodes defines contact areas. Position information for what is referred to in the present patent as a cursor is calculated from this set of nodes.

In the case of a plurality of sets of nodes separated by inactive areas, a plurality of independent cursors is determined during the same scanning phase. This information is refreshed periodically during new scanning phases.

The cursors are created, tracked or destroyed as a function of information obtained during successive scans. The cursor is calculated by a contact area barycenter function, for example.

The general principle is to create as many cursors as there are areas detected on the tactile sensor and to track their evolution in time. When the user removes his fingers from the sensor, the associated cursors are destroyed. In this way it is possible to capture the position and the evolution of a plurality of fingers on the tactile sensor simultaneously.

The electrical characteristic actually measured can be the resistance or the capacitance. The sensor is then referred to as a resistive or capacitive tactile sensor, respectively.

The tactile module consisting of the tactile sensor and the control circuit delivers signals to a communication interface. These signals are then processed by the main processor 4 of the computerized equipment, the graphical user interface (GUI) of which is adapted to process a plurality of simultaneous cursors. The cursors make it possible to interact with a plurality of graphic objects simultaneously.

The main program considers the positions of the cursors and on which graphic object each is situated. Specific processing is applied to the data from the sensor as a function of the graphic object concerned. For example, this processing can take account of measurements of pressure, acceleration, speed, trajectory, etc.

The main processor 4 contains the control electronic circuit for controlling acquisition and analysis of data on the state of the matrix tactile sensor 1.

FIG. 2 represents a diagram of the method 11 of acquiring data over the whole of the multicontact tactile sensor (acquisition 1). Said sensor comprises M rows and N columns.

This method has the function of determining the state of each point of the matrix tactile sensor 1, namely whether contact is made at said point or not.

The frequency for sampling the rows and the columns of the tablet forming the sensor is of the order of 100 Hz.

Said method corresponds to measuring all points of a "voltage" matrix. Said matrix is an [N,M] matrix containing at each point (I,J) the value of the voltage measured at the terminals of the point of intersection of the row I and the column J, with $1 \leq I \leq N$ and $1 \leq J \leq M$. This matrix makes it possible to specify the state of each of the points of the matrix tactile sensor 1 at a given time.

The acquisition method 11 (acquisition 1) begins with a step 12 of initialization of the data obtained during a preceding acquisition.

Arbitrarily, the column axis constitutes the energization axis and the row axis constitutes the detection axis.

The method 11 first scans the first column. It is energized at 5 volts, for example. For said column, the electronic circuit measures the voltage at the terminals of the point of intersection between said column and each of rows 1 to N.

When the measurement has been effected for the Nth row, the method proceeds to the next column and resumes the voltage measurements at the terminals of the intersection of the new column concerned and each of rows 1 to N.

When all the columns have been scanned, the voltages at the terminals of each of the points of the matrix tactile sensor 1 have been measured. The method is then terminated and the electronic circuit can proceed to analyze the voltage matrix obtained.

FIG. 3 represents a diagram of the data analysis method 21 (analysis 1).

Said method consists of a series of algorithms performing the following steps:
  one or more filtering operations 22,
  determination 23 of encompassing areas of each contact area,
  determination 24 of the barycenter of each contact area,
  interpolation 25 of the contact area, and
  prediction 26 of the trajectory of the contact area.

Once the analysis method 21 has ended, the software is able to apply various dedicated processing operations to the virtual graphic objects on the display screen 2 in order to refresh said display screen 2 in real time. Areas encompassing the contact area detected during the acquisition step 11 are also defined.

In the prior art, the electronic circuit loops the methods 11 and 21 at a frequency of the order of 100 Hz. The drawback of such an electronic circuit is excessive electrical consumption.

To alleviate the drawbacks of the prior art, the electronic circuit integrates a method of controlling the mode of operation of the sensor.

As shown in FIGS. 4 and 5, the electronic circuit has two modes of operation:
  a "multicontact" type first mode of operation 32, in which the acquisition and analysis methods for the whole of the tactile sensor conform to the methods 11 and 21 described above, and
  a "monocontact" type second mode of operation 33 in which the acquisition and analysis methods for the whole of the tactile sensor conform to those of monocontact operation.

The monocontact mode of operation 33 is characterized by continuous and uniform energization of the whole of the sensor. It corresponds to an idle state of the sensor and the control circuit.

This mode of operation uses a data acquisition method 51 (acquisition 2). This method corresponds to measuring all points of the N×M voltage matrix that contains at each point (I,J) the value of the voltage measured at the terminals of the point of intersection of the row I and the column J, with $1 \leq I \leq N$ and $1 \leq J \leq M$.

During this method 51, the columns are all energized continuously and uniformly. Because of this, only the leakage currents are measured. Detection is effected by scanning the rows. In this case, when there is a contact, it is not possible to determine the column corresponding to said contact, since all the columns are energized uniformly and continuously. Thus position information for the contact is not provided.

A data analysis method 61 (analysis 2) is then applied to the data acquired by the method 51. This method includes one or more filtering steps. It advantageously includes no step of determining a contact area, if any, the position information for the contacts not being made available.

It is of no benefit to collect a complete image of said sensor continuously if the user is not touching the sensor. Moreover, when the user places his fingers on the sensor, if switching between the idle mode and the normal mode is relatively fast, it is not necessary to know the position of the fingers on the sensor at the time of the first contact information.

The idle—or monocontact—mode corresponds to an idle state of the sensor and the control circuit which must merely be able to detect modification of an electrical parameter of the sensor when at least one contact is produced by the user without being able to analyze the position of said contacts.

The conditional passage to the normal multicontact mode 32 then makes it possible to obtain the multicontact position information in a short time period.

FIG. 4 represents a diagram of the method 31 (idle 1) of controlling the operating mode of the sensor of the present invention.

This method comprises a first loop 32 in multicontact mode corresponding to the succession of the acquisition step 11 and the analysis step 21.

At the end of said first loop 32, conditional control is operative. If at least one contact point is detected over the whole of the matrix tactile sensor 1, the method enters the monocontact mode second loop 33, corresponding to the succession of the acquisition step 51 and the analysis step 61.

This embodiment makes it possible to switch between the multicontact and monocontact modes instantaneously, controlled by the detection of at least one contact, if any. The electrical consumption is thus reduced significantly, since operation in monocontact mode consumes very much less electrical energy than operation in multicontact mode.

FIG. 5 represents a diagram of the method 41 (idle 2) of controlling the operating mode of the sensor of the present invention.

This method differs from the previous one in that it includes an iteration N corresponding to a latency time between the multicontact mode and the monocontact mode.

The integer N is a number characteristic of the number of successive periods of the loop 32 during which no contact is detected. The predetermined latency time $N_{latency}$ corresponds to the number of successive periods in which contact is not detected after which the sensor goes to the monocontact mode.

This method comprises a multicontact first loop 32 and a monocontact second loop 33. After each loop 32, conditional control is operative. If at least one contact is detected on exit from the loop 32, the latter is repeated.

If no contact is detected on exit from this loop 32, the number N of successive periods without contact is looked at. If N is less than $N_{latency}$, N is incremented and the loop 32 is repeated. If N is equal to $N_{latency}$, the monocontact loop 33 is executed. For as long as no contact is detected on exit from the loop 33, the latter loop is repeated.

As soon as contact is detected on exit from this loop 33, N returns to 0 and the multicontact loop 32 is again executed.

This embodiment makes it possible to switch between the multicontact and monocontact modes controlled by the detection of at least one contact, if any, with a latency time for the passage from the multicontact mode to the monocontact mode.

This embodiment of the present invention thus has the advantages of:
 going instantaneously from the monocontact mode to the multicontact mode on detection of a contact, and
 going with a predetermined latency time from the multicontact mode to the monocontact mode, which avoids excessively frequent multicontact/monocontact switching if contact is inadvertently not detected during a single period.

N can be chosen to obtain a latency time of the order of 1 second, for example.

The embodiments of the present invention described above are provided by way of example and are in no way limiting on the present invention. It is to be understood that the person skilled in the art is able to conceive of different variants of the present invention without departing from the scope of the patent.

The invention claimed is:

1. A multicontact tactile sensor comprising:
 a matrix including two transparent conductive layers, at least one including an array of fine conductive tracks; and
 a control circuit including energization means for one of the layers and detection means for the other layer;
 the sensor including a multicontact mode of operation corresponding to scanned energization of rows of the corresponding layer, and an idle mode of operation corresponding to continuous and uniform energization of a whole of the multicontact tactile sensor, each mode of operation being activated as a function of detection or non-detection of at least one contact.

2. A multicontact tactile sensor according to claim 1, wherein the multicontact mode is activated by the detection of at least one contact.

3. A multicontact tactile sensor according to claim 1, wherein the idle mode is activated by absence of detection of at least one contact.

4. A multicontact tactile sensor according to claim 3, wherein the idle mode is activated after a latency time during which no contact is detected.

5. A multicontact tactile sensor according to claim 1, wherein the multicontact type mode of operation corresponds to scanned energization of the rows of the corresponding layer and to measurement at terminals of a point of intersection between the energized rows and each of columns of the other layer.

6. A multicontact tactile sensor according to claim 1, wherein the idle mode corresponds to an idle state of the sensor and the control circuit.

7. A multicontact tactile sensor according to claim 1, wherein the idle mode of operation corresponds to continuous and uniform energization of all columns and to detection effected by scanning the rows.

8. A multicontact tactile sensor according to claim 1, which is transparent.

* * * * *